United States Patent
Carty (10) Patent No.: US 7,219,181 B2
(45) Date of Patent: May 15, 2007

(54) DUAL USE MODULAR PCI/PCI EXPRESS INTERFACE

(75) Inventor: Clark Carty, Brunswick, OH (US)

(73) Assignee: Cisco Technology, Inc., San Jose, CA (US)

( * ) Notice: Subject to any disclaimer, the term of this patent is extended or adjusted under 35 U.S.C. 154(b) by 121 days.

(21) Appl. No.: 10/906,122

(22) Filed: Feb. 3, 2005

(65) Prior Publication Data

US 2006/0174047 A1 Aug. 3, 2006

(51) Int. Cl.
*G06F 13/00* (2006.01)
(52) U.S. Cl. .................. 710/301; 710/313; 710/315
(58) Field of Classification Search .............. None
See application file for complete search history.

(56) References Cited

U.S. PATENT DOCUMENTS

| | | | |
|---|---|---|---|
| 6,463,493 B1 * | 10/2002 | Hayes et al. | 710/301 |
| 6,857,038 B2 * | 2/2005 | Liu et al. | 710/301 |
| 7,014,492 B1 * | 3/2006 | Lim et al. | 439/367 |
| 2003/0229748 A1 | 12/2003 | Brewer et al. | 710/305 |
| 2005/0144385 A1 * | 6/2005 | Mowery et al. | 711/115 |
| 2005/0160214 A1 * | 7/2005 | Sauber et al. | 710/315 |
| 2005/0182881 A1 * | 8/2005 | Chou et al. | 710/301 |
| 2005/0215085 A1 * | 9/2005 | Mehta et al. | 439/65 |
| 2006/0085585 A1 * | 4/2006 | Wu et al. | 710/306 |
| 2006/0109636 A1 * | 5/2006 | Hood et al. | 361/792 |
| 2006/0158864 A1 * | 7/2006 | Gay | 361/785 |

FOREIGN PATENT DOCUMENTS

TW 226553 B1 * 1/2005

OTHER PUBLICATIONS

Brewer, Jim and Sekel, Joe; "PCI Express Technology"; Dell White Paper; Dell Inc.; Feb. 2004.*
http://www.interfacebus.com/Design_Connector_PCI_Express. html, Serial PCI Express Bus Description, Logic Design Information, "PCI Express Bus", pp. 1-4.
http://www.techadvice.com/tech/C/CardBus.htm, Techadvice.com, CardBus-Information, "CardBus", pp. 1-2.
http://www.interfacebus.com/Design_Connector_Mini_PCI_Bus.html, Mini PCI Bus Description; Peripheral Component Interface for the Laptop PC, Logic Design Information, "Mini PCI Bus", pp. 1-3.
Leland Teschler, "PC systems Pony up to PCI Express", MachineDesign.com, http://www.machinedesign.com/ASP/strArticleID/55541/strSite/MDSite/viewSelectedArti..., pp. 1-4.

* cited by examiner

*Primary Examiner*—Glenn A. Auve
(74) *Attorney, Agent, or Firm*—Tucker Ellis & West, LLP (57) ABSTRACT

Techniques where PCIe is implemented using connectors that are compatable with Cardbus/MPCI connectors. One technique implements PCIe on unused pins on Cardbus/MPCI connectors. An advantage of this implementation is that it provides a single, smaller connection point than utilizing separate connectors. Another technique is to add additional pins to a PCI connector for processing PCIe low voltage differential signal pairs. Although this technique is not as small as the first technique, it is still smaller than utilizing separate connectors.

9 Claims, 5 Drawing Sheets

DUAL USE MODULAR PCI/PCI EXPRESS INTERFACE

BACKGROUND OF THE INVENTION

The present invention relates generally to a modular connection capable of supporting PCI (Peripheral Component Interconnect) and PCI Express (PCIe) interfaces, and more specifically to removable a radio slot for a wireless local area network (WLAN) access point (AP).

A typical access point (AP) can employ a removable radio slot to enable it to be quickly and easily updated. For example, a chipset can be developed for to implement an 802.11 standard for the AP. The chipset is mounted on a removable card, such as a PCI card that is plugged into the access point. As changes to the standard occur, the AP can be updated by merely replacing the removable card in the AP with a removable card having a new chipset.

In the past, changing the removable card has not been a problem because 802.11 chipsets have been employed on cards using standard off the shelf PCI connectors (e.g., Cardbus, MPCI, PC104+). However, future 802.11 chipsets will utilize PCI Express (PCIe) connections due to the fact that laptops, and other small computer devices, will abandon the Cardbus interface in favor of the PCIe interface. Because of the uncertainty of exactly when the change from Cardbus to PCIe will occur, it is desirable that a modular AP have both PCI and PCIe connections. If separate, standard MCPI/Cardbus and PCI Express card interfaces are both installed on an AP, then the physical size of the AP will be larger than desired.

Thus, it would be desirable for an AP, or any other computing device, to be able to support the Cardbus PCI interface and the PCI Express interface using only one connector. However, the connector would have to be designed to overcome incompatibilities between the PCI and PCI express interfaces as will be explained hereinbelow.

The PCI bus was originally developed as a local bus expansion slot for the Personal Computer and was coined the PCI Local Bus. The specification started as an add-on to the ISA form factor with the PCI bus requiring its own connectors. The PCI spec defines Electrical requirements for the interface. No bus terminations are specified, the bus relies on signal reflection to achieve level threshold. The first Desk Top version of the PCI bus ran at 33 MHz with a 32 bit bus (133 MBps), the current Desk Top version runs at 66 MHz with a 64 bit bus. The Laptop version, (Mini-PCI) operates at 33 MHz with a 32 bit bus. The PCI bus operates either synchronously or asynchronously at the motherboard's bus rate. While operating asynchronously, the bus will operate at any frequency, e.g., from 66 MHz down to (and including) 0 Hz. Flow control is added to allow the bus to operate with slower devices on the bus, allowing the bus to operate at their speed. There are three card configurations for the Mini PCI bus, Type 1, Type II and Type III. Type I and Type II use a 100 pin connector, while Type III uses a 124 pin connector.

By contrast, PCI Express uses a pair of LVDS (Low Voltage Differential Signal) drivers and receivers and is not compatible with the legacy PCI bus, which does not use differential transceivers. The PCI Express bus uses two low-voltage differential signal pairs at 2.5 Gb/s in each direction, one pair for transmit, and one pair for receive. The differential trace impedance is defined as 100 ohms, ±15%. Each pair is capacitive coupled at the receiver. PCI Express supports 1×[2.5 Gbps], 2×, 4×, 8×, 12×, 16×, and 32× bus widths [transmit/receive pairs].

BRIEF SUMMARY OF THE INVENTION

In accordance with an aspect of the present invention, PCIe is implemented on unused pins on Cardbus/MPCI connectors. An advantage of this implementation is that it provides a single, smaller connection point than utilizing separate connectors.

In accordance with an aspect of the present invention, there is disclosed herein a system that comprises a connector that is coupled to a communications interface using a first coupler coupling a first set of pins to the communications interface and a second coupler connecting a second set of pins to the communications interface. Signals received on the first set of pins are processed differently than signals received on the second set of pins. For example, the first set of pins can be configured to process peripheral component interconnect (PCI) signals and the second set of pins configured to process peripheral component interconnect express (PCIe) signals. Optionally, when a card is plugged into the connector, if the card communicates using the second set of pins, the card can receive power and ground connections from the first set of pins.

As another example, the connector can be used by an access point to receive cards having 802.11 media access control (MAC) chipsets. If the card is a PCI card, then the signals are received on the first set of pins. If the card is a PCIe card, then the low voltage differential signals are received on the second set of pins. The communications interface then forwards signals from the 802.11 MAC card to the access point's processor.

In accordance with another aspect of the present invention, there is described herein a system comprising two sets of pins. The first set of pins and the second set of pins are isolated from each other. In one embodiment, the first set of pins can be PCI connectors (either Type I, Type II or Type III) and the second set of pins configured to process low voltage differential signals. When a PCI card is plugged into the connector, only the first set of pins are engaged, whereas when a PCIe card is plugged into the connector, the first set of pins and the second set of pins are engaged.

In accordance with an aspect of the present invention there is described herein a method that determines whether a signal is being received on a connector is being received on a set of pins designated for a low voltage differential signal. If the signal is not a low voltage differential signal, the method is responsive to process the signal as a peripheral component interconnect signal. If the signal is a low voltage differential signal, the method is responsive to process the signal as a peripheral component interconnect express signal.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification illustrates several aspects of the present invention, and together with the description serve to explain the principles of the invention.

FIG. 1 is a block diagram of a system in accordance with an aspect of the present invention.

DETAILED DESCRIPTION OF INVENTION

Throughout this description, the preferred embodiment and examples shown should be considered as exemplars, rather than limitations, of the present invention.

The present invention provides for both PCI and PCIe connectivity to the same modular slot of a computing device, such as an access point, minimizing space and cost. For a modular 802.11 access point that provides modular radio connectivity, the present invention provides support for current PCI based radio chipsets and offers expandability and support for further radio chipsets based on PCIe.

In accordance with an embodiment of the present invention, PCIe is run over unused pins on Cardbus/MPCI connectors. This has the advantage of providing a single smaller connection point than utilizing separate connectors. This embodiment also could provide a PCIe card type design with extra power for access point type applications versus a client card application. An aspect of the present invention is to determine optimum placement for the at least two high differential pairs.

In accordance with another embodiment of the present invention, a new connector is used that closely resembles a standard PCI connector with as little as 4 additional pins for the two PCIe differential pairs. This connector would still be smaller than using separate PCI and PCIe connectors and thus save space.

Utilizing either of the aforementioned embodiments provides dual bus capability to be delivered on a single connector that minimizes space, while providing maximum power to be delivered, and minimizing cost.

A single SEEPROM on the computing devices (e.g. access point's) printed circuit board would identify the module type as either PCI or PCIe. For access points, the single connector can be utilized for both PCI and PCIe based radios. If this level of sophistication is not required, a single pin can be used to denote the type of module being plugged into the connector (e.g., pulled high for PCI and low for PCIe). Additional pins can be provided to the connector to enable the microprocessor to identify the type of radio antenna installed on the radio card.

Figure 1:
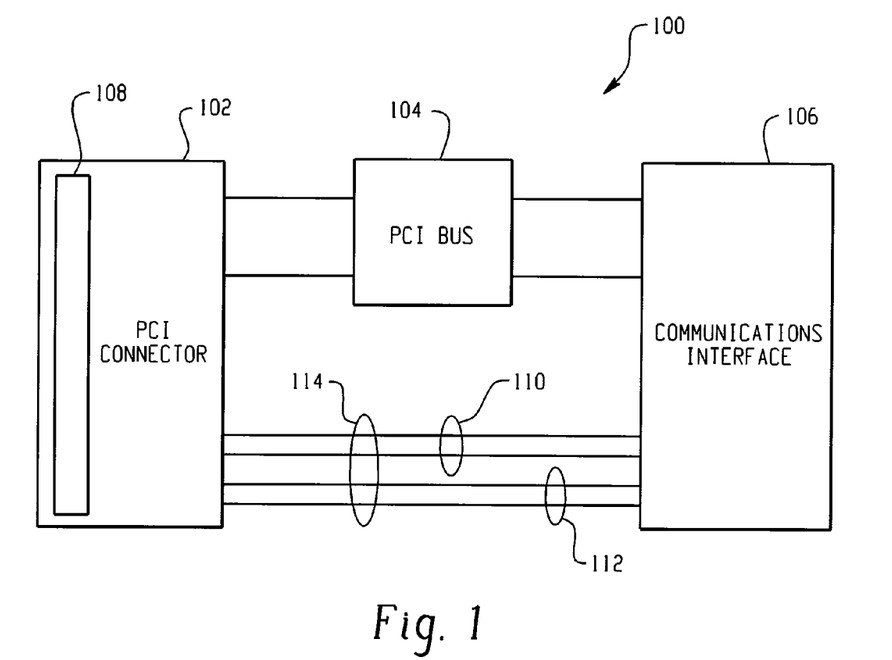

FIG. 1 is a block diagram of a system 100 in accordance with an aspect of the present invention. The system has a PCI connector 102. The PCI connector has a plurality of pins 108 for receiving a modular card. A PCI bus 104 is used to connect a first set of pins from PCI connector 102 to communications interface 106. Second connector 114 comprises differential pairs 110 and 112 and connects a second set of pins from PCI connector 102 to communications interface 106.

In an embodiment of the present invention the communications interface is configured to process signals from the second set of pins 110, 112 (second coupler 114) using a second communications protocol. Other signals that are not using the second set of pins 110, 112 are processed using a first communications protocol.

In an embodiment of the present invention, the connector is a peripheral component interconnect connector. The first communications protocol, that is for signals not received by the second coupler 114 (via differential pairs 110, 112) is a peripheral component interconnect (PCI) protocol and the second communications protocol is a peripheral component interconnect express (PCIe).

In accordance with an embodiment of the present invention, the first coupler is a peripheral component interconnect. The second coupler 114 couples unused PCI pins from connector 102 to communications interface 106, and communications interface 106 is configured to process signals on the second coupler 110, 112 as low voltage differential signals.

In accordance with an embodiment of the present invention, pins 108 of connector 102 are suitably adapted to receive a PCI or a PCIe card (not shown). When a personal interface express card is plugged into connector 102, the personal interface card receiving power and grounding from the first set of pins (pins connected to PCI bus 104) and the PCI card is transmitting and receiving low voltage differential signals on the second set of pins 110, 112.

Typically, a PCIe card should be provided with about 6 power pins and 12 ground pins. These pins may be provided on pins coupled to the first coupler (PCI bus) 104 or using pins coupled to the second coupler (e.g., differential pairs 11, 112). The number of pins utilized should supply a sufficient amount of current to the PCIe card with low inductance.

Figure 2:
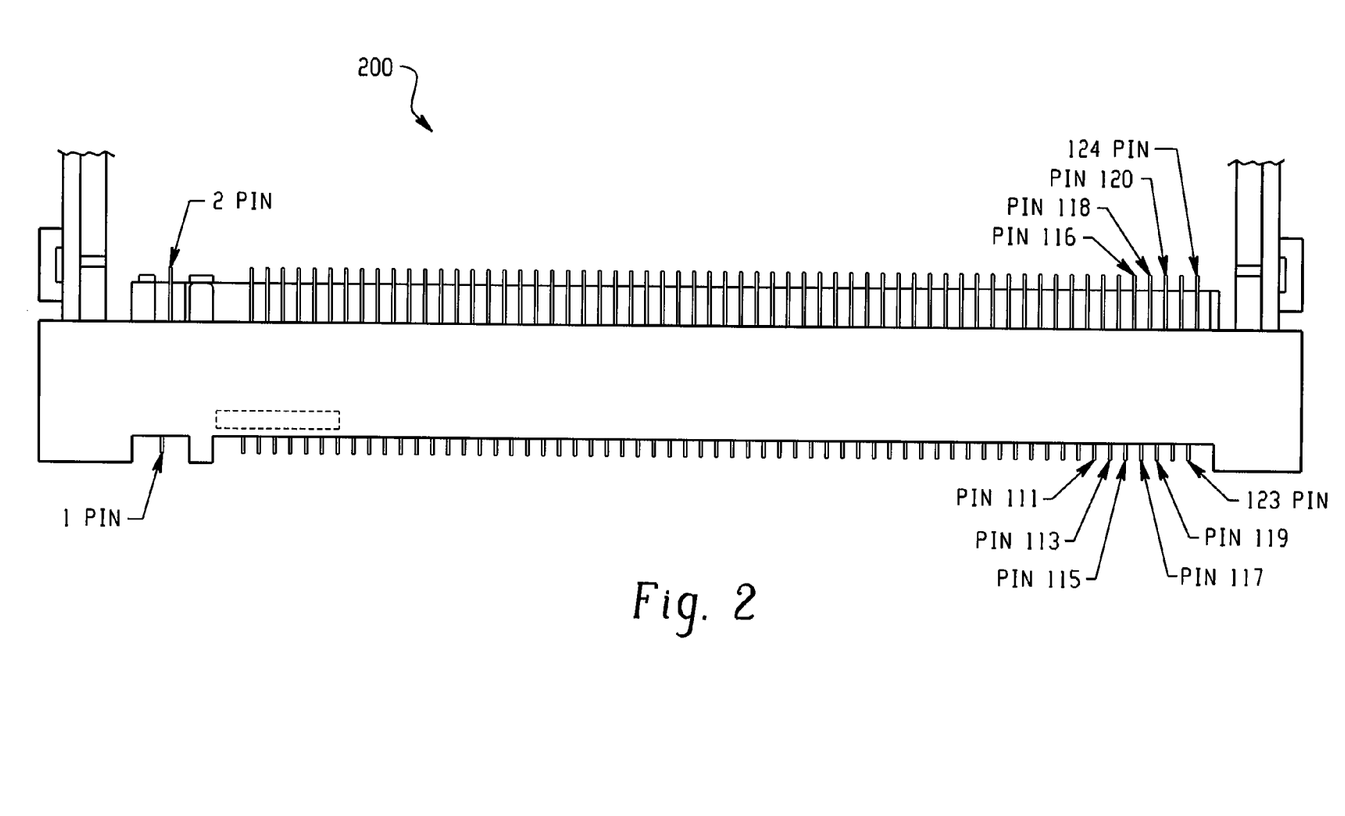
FIG. 2 is an isometric diagram of a connector suitably adaptable for the present invention.

FIG. 2 is an isometric diagram of a MiniPCI Type III connector 100 suitably adaptable for the present invention. This type of connector uses 124 pins. As shown, even number pins (pin 1,3, . . . 123) are at the bottom of the connector and even number pins (2 . . . 124) are on the top of the connector. This is merely for illustrative purposes only. Referring to Table 1, there is illustrated a pin diagram for a 124 pin MiniPCI Type II connector.

TABLE 1

| Pin assignments for typical Type III PCI Connector | | | |
|---|---|---|---|
| Pin | Signal | Pin | Signal |
| 1 | TIP | 2 | RING |
| 3 | RJ45-3 | 4 | RJ45-1 |
| 5 | RJ45-6 | 6 | RJ45-2 |
| 7 | RJ45-7 | 8 | RJ45-4 |
| 9 | RJ45-8 | 10 | RJ45-5 |
| 11 | LED1_GRNP | 12 | LED1_YELP |
| 13 | LED1_GRNN | 14 | LED1_YELN |
| 15 | CHSGND | 16 | RESERVED |
| 17 | INTB# | 18 | 5 V |
| 19 | 3.3 V | 20 | INTA# |
| 21 | RESERVED | 22 | RESERVED |
| 23 | GROUND | 24 | 3.3 VAUX |
| 25 | CLK | 26 | RST# |
| 27 | GROUND | 28 | 3.3 VAUX |
| 29 | REQ# | 30 | GNT# |
| 31 | 3.3 V | 32 | GROUND |
| 33 | AD[31] | 34 | PME# |
| 35 | AD[29] | 36 | RESERVED |
| 37 | GROUND | 38 | AD[30] |
| 39 | AD[27] | 40 | 3.3 VAUX |
| 41 | AD[25] | 42 | AD[28] |
| 43 | RESERVED | 44 | AD[26] |
| 45 | CBE[3]# | 46 | AD[24] |
| 47 | AD[23] | 48 | IDSEL |
| 49 | GROUND | 50 | GROUND |

TABLE 1-continued

Pin assignments for typical Type III PCI Connector

| Pin | Signal | Pin | Signal |
|---|---|---|---|
| 51 | AD[21] | 52 | AD[22] |
| 53 | AD[19] | 54 | AD[20] |
| 55 | GROUND | 46 | PAR |
| 57 | AD[17] | 48 | AD[18] |
| 59 | CBE[2]# | 60 | AD[16] |
| 61 | IRDY# | 62 | GROUND |
| 65 | CLKRUN# | 66 | TRDY# |
| 67 | SERR# | 68 | STOP# |
| 69 | GROUND | 70 | 3.3 v |
| 71 | PERR# | 72 | DEVSEL# |
| 73 | CBE[1]# | 74 | GROUND |
| 75 | AD[14] | 76 | AD[15] |
| 77 | GROUND | 78 | AD[13] |
| 79 | AD[12] | 80 | AD[11] |
| 81 | AD[10] | 82 | GROUND |
| 83 | GROUND | 84 | AD[09] |
| 85 | AD[08] | 86 | CBE[0]# |
| 87 | AD[07] | 88 | 3.3 V |
| 89 | 3.3 V | 90 | AD[06] |
| 91 | AD[05] | 92 | AD[04] |
| 93 | RESERVED | 94 | AD[02] |
| 95 | AD[03] | 96 | AD[00] |
| 97 | 5 V | 98 | RESERVED |
| 99 | AD[01] | 100 | RESERVED |
| 101 | GROUND | 102 | GROUND |
| 103 | AC_SYNC | 104 | M66EN |
| 105 | AC_SDATA_IN | 106 | AC_SDATA_OUT |
| 107 | AC_BIT_CLK | 108 | AC_CODEC_ID#0 |
| 109 | AC_CODEC_ID#1 | 110 | AC_RESET# |
| 111 | MOD_AUDIO_MON | 112 | RESERVED |
| 113 | AUDIO_GND | 114 | GROUND |
| 115 | SYS_AUDIO_OUT SYS_AUDIO_OUT | 116 | SYS_AUDIO_IN SYS_AUDIO_IN |
| 117 | GND | 118 | GND |
| 119 | AUDIO_GND | 120 | AUDIO_GND |
| 121 | RESERVED | 122 | MPCIACT# |
| 123 | VCC5VA | 124 | 3.3 VAUX |

The exemplary pin connections listed in Table 1 will be used hereinbelow in FIG. 3 for determining unused PCI pins for an access point.

Figure 3:
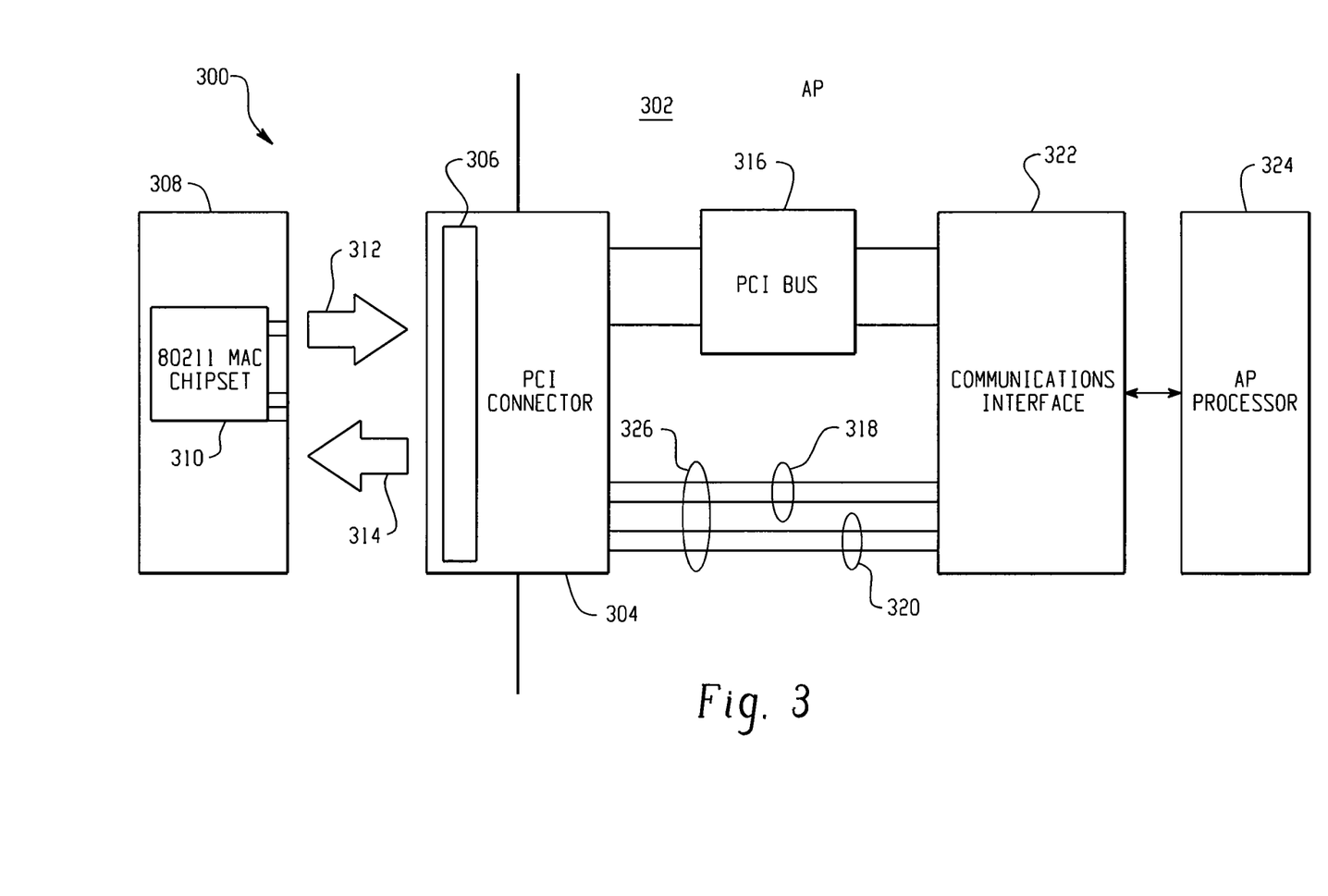
FIG. 3 is a block diagram of a wireless transceiver in accordance with an aspect of the present invention.

FIG. 3 is a block diagram of a wireless transceiver 300 in accordance with an aspect of the present invention. The connector 304 is connected on one side to an access point 302 and provides connectivity to a modular card 308 containing an 802.11 MAC chipset 310.

Modular card 308 is suitably one of a PCI card or a PCIe card. The card is inserted into pins 306 of connector 304 by moving in direction 312 and removed from connector 304 by moving in direction 314. When card 308 has engaged pins 306 of connector 304, signals (which may also include power) are exchanged between connector 304 and communications interface 322.

If card 308 is a PCI card, then only signals are received on a first set of pins of connector 308, which are sent across first coupler 316 (PCI bus) to communications interface 322. The first set of pins provide power and grounding required for card 308.

If card 308 is a PCIe card, then signals are sent across a second coupler 326 that includes differential pairs 318, 320. In a preferred embodiment, differential pairs 318, 320 are suitable for processing LVDS signals. In one embodiment, additional unused PCI pins provide power and grounding to card 308. In another embodiment, card 308 receives power and grounding using pins connected to the first coupler 316.

For example, card 308 is connected to pins 306 of connector 308. Communication interface 322 determines whether signals are being received on differential pairs 318, 320. If a signal is being received on one of differential pairs 318, 320, then communication interface 322 determines that card 308 is a PCIe card and processes the signals as PCIe signals. If no signals are received on differential pairs 318, 320, then communication interface 322 determines that card 308 is a PCI card.

Signals sent from card 308 are then sent to AP processor 324 by communication interface 322. Signals from AP processor 324 to card 308 are processed by communications interface 322 in accordance with the type of connection that card 308 is utilizing.

For example, in accordance with an embodiment of the present invention, assuming connector 304 is a MPCI Type III connector as illustrated in FIG. 2, the second set of pins comprises pins 111, 113, 115, 116, 117, 118, 119 and 120 because the functions normally assigned to these pins are typically not implemented by an access point. Therefore, these pins are available for other functions, such as for supporting a PCIe interface in accord with the present invention. In a preferred embodiment, pins 111, 116, 117 and 120 are grounds. Furthermore, pins 113 and 115 are used for a Low Voltage Differential Signal (LVDS) transmit pair for the PCIe interface. Moreover, pins 118 and 119 are used for a LVDS receive pair for the PCIe interface. Using the example of FIG. 3, differential pair 318 uses pins 113, 115 and differential pair 320 uses pins 118, 119. Ground pins 111, 116, 117 and 120 can either be separate connections between connector 304 and communications interface 322 (not shown), or can be connected between connector 308 and communications interface 316 employing the first coupler (PCI Bus) 316.

In an embodiment of the present invention, additional unused pins can be provided to the second connector 322 to enable the processor 324 to identify the type of radio antenna installed on (radio) card 308.

Figure 4:
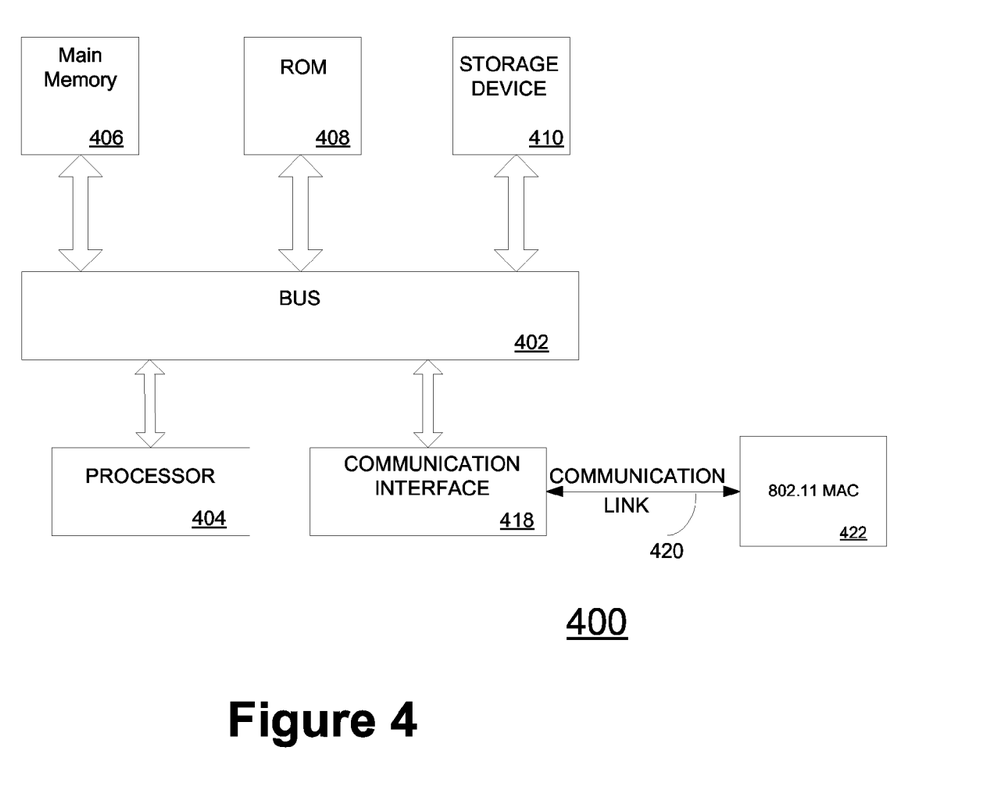
FIG. 4 is a block diagram of a processor system in accordance with an aspect of the present invention.

FIG. 4 is a block diagram of a computer system 400 upon which an embodiment of the invention may be implemented. Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a ready only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 also includes a communication interface 418 coupled to bus 402. Communication interface 418 provides a two-way data communication coupling to a communication link 420 that is connected to an 802.11 Media Access Controller (MAC). For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Communication link 420 typically provides data communication to other data devices. For example, network link 420 may provide a connection an 802.11 MAC 422. Communication link 420 may use electrical, electromagnetic, or optical signals to carry digital data to and from computer system 400 and 802.11 MAC 422, and are exemplary forms of carrier waves transporting the information.

Computer system 400 can send messages and receive data, including program codes, through the network(s), network link 420, and communication interface 418. For example, communication interface 418 can download program codes from 802.11 MAC 422 to be executed by processor 404. The received code may be executed by processor 404 as it is received, and/or stored in storage device 410, or other non-volatile storage for later execution. In this manner, computer system 400 may obtain application code in the form of a carrier wave.

Figure 5:
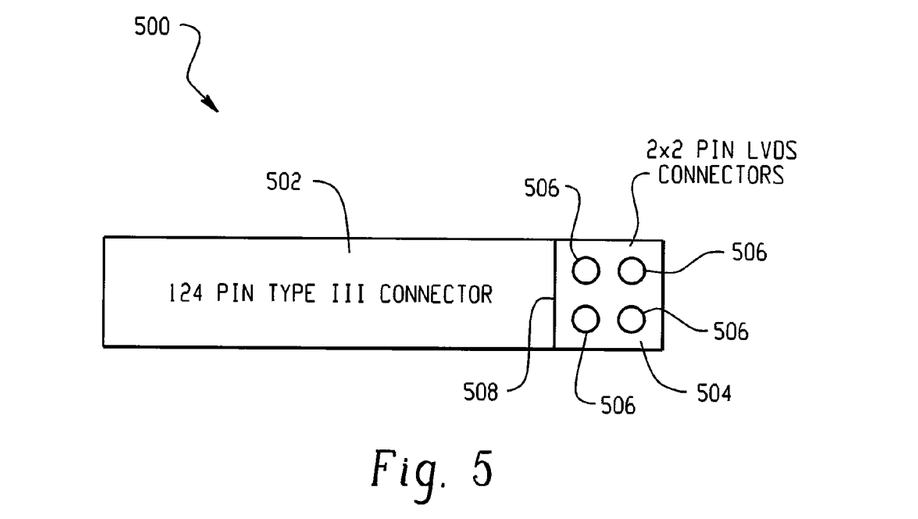
FIG. 5 is a block diagram of an alternative embodiment of the present invention.

FIG. 5 is a block diagram of an alternative embodiment 500 in accordance with an aspect of the present invention. The embodiment 500 comprises a first section 502, which for the purposes of this illustration is a 124 pin MPCI Type III connector and a second section 504. The first section 502 is used for connecting PCI cards. The second section 504 provides four additional pins 506 for processing the LVDS pairs for PCIe cards. Optionally, a barricade 508 separates the PCI pins from the additional four pins 506 for the PCIe cards. Although connector 500 is slightly larger than the connectors described in FIGS. 1 and 3, connector 500 is still smaller in size than using a separate PCI connector and a PCIe connector. When implementing connector 500 in an access point, additional pins (not shown) can be provided in second section 504 of the connector to enable the microprocessor to identify the type of radio antenna installed on the radio card.

Figure 6:
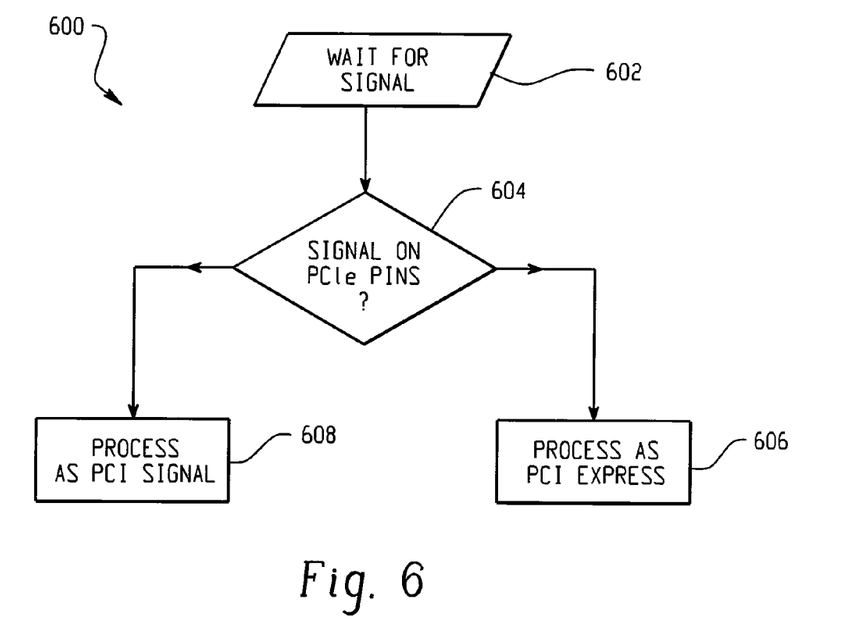
FIG. 6 is a block diagram of a methodology in accordance with an aspect of the present invention.

In view of the foregoing structural and functional features described above, a methodology in accordance with various aspects of the present invention will be better appreciated with reference to FIG. 6. While, for purposes of simplicity of explanation, the methodology of FIG. 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

FIG. 6 is a block diagram of a methodology 600 in accordance with an aspect of the present invention. The methodology is compatible with configurations as shown in FIGS. 1–3 or with the configuration illustrated in FIG. 5. The methodology 600 waits until receiving a signal at 602. At 604 it is determined whether the signal has a component on a PCIe interface. For example, if a LVDS was received on a differential pair. In one embodiment, the LVDS is received on a differential pair employing unused pins of the PCI connector. In an alternative embodiment, the LVDS is received on additional pins added to the connector expressly for receiving LVDS signals.

If at 604, the signal was determined to be a PCIe signal, then at 606 the signal is processed as a PCIe signal. In addition, if there are signals that are to be sent back, then the return signals are sent in the PCIe format. After processing the signal is completed, then the process waits at 602 for additional signals.

If at 604, the determination was made that the signal was not a PCIe signal, then at 608 the signal is processed as a PCI signal. In addition, if there are signals that are to be sent back, then the return signals are sent in the PCI format. After processing the signal is completed, then the process waits at 602 for additional signals.

After the signals have been processed at 606 or 608, methodology 600 returns to 602 and when a new signal is received, the type of signal of the new signal is determined at 604. Thus, if the type of card at the connection is changed, the process will discover the change and process the signal accordingly.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

What is claimed is:

1. A system, comprising:
   a communications interface;
   a peripheral component interconnect connector;
   a first coupler coupling a first set of pins of the connector to the communications interface; and
   a second coupler coupling a second set of pins of the connector to the communications interface;
   a processor coupled to the communications interface,
   wherein the processor is part of an access point, the connector is suitably adapted to receive a card containing media access control layer processor; and
   wherein the card is one of a peripheral component interconnect card and a peripheral component interconnect express card.

2. A system according to claim 1, wherein the first set of pins provide power and grounding to the card.

3. A system according to claim 1, wherein the card is a peripheral component interconnect express card configured to transmit low voltage differential signals on a pair of pins of the second set of pins.

4. A system according to claim 3, wherein the peripheral component interconnect express card is configured to receive low voltage differential signals on a second pair of pins of the second set of pins.

5. A system according to claim 1, wherein the connector is a Mini Peripheral Component Interconnect Type III connector with 124 pins, wherein the second set of pins comprise pins 111, 113, 115, 116, 117, 118, 119 and 120.

6. A system according to claim 5, wherein pins 111, 116, 117 and 120 are grounds.

7. A system according to claim 6, wherein pins 113 and 115 are used for a peripheral component interconnect express transmit pair.

8. A system according to claim 7, wherein pins 118 and 119 are used for a peripheral component interconnect express receive pair.

9. A system, comprising:
   a Mini Peripheral Component Interconnect Type III connector with 124 pins;
   a communications interface;
   a first coupler coupling a first set of pins of the connector to the communications interface; and
   a second coupler coupling a second set of pins of the connector to the communications interface.

* * * * *